(12) United States Patent
Aune et al.

(10) Patent No.: US 6,980,580 B2
(45) Date of Patent: Dec. 27, 2005

(54) ELECTRODE ARRANGEMENT AS SUBSTITUTE BOTTOM FOR AN ELECTROTHERMIC SLAG SMELTING FURNACE

(75) Inventors: Jan Arthur Aune, Enebakk (NO); Jon Christian Brinch, Oslo (NO); Kai Johansen, Kristiansand (NO)

(73) Assignee: Alcoa Inc., Pittsburgh, PA (US)

( * ) Notice: Subject to any disclaimer, the term of this patent is extended or adjusted under 35 U.S.C. 154(b) by 0 days.

(21) Appl. No.: 10/646,507

(22) Filed: Aug. 23, 2003

(65) Prior Publication Data

US 2005/0041719 A1    Feb. 24, 2005

(51) Int. Cl.⁷ ................................. H05B 7/07
(52) U.S. Cl. ................. 373/61; 373/48; 373/65; 373/102; 373/104; 373/105
(58) Field of Search ................. 373/42, 44, 45, 373/47, 48, 52, 53, 62, 65; 75/10.27, 412; 266/160, 176

(56) References Cited

U.S. PATENT DOCUMENTS

| | | | |
|---|---|---|---|
| 3,746,075 A | * | 7/1973 | Paton et al. ............... 373/54 |
| 3,838,200 A | * | 9/1974 | Paton et al. ............... 373/42 |
| 3,885,082 A | * | 5/1975 | Hanas ........................ 373/76 |
| 4,027,092 A | * | 5/1977 | Medovar et al. ........... 373/53 |
| 4,099,959 A | | 7/1978 | Dewing et al. ............ 75/10 |
| 4,246,023 A | * | 1/1981 | Savov et al. ............... 373/53 |
| 4,375,449 A | | 3/1983 | Siddall ....................... 373/33 |
| 4,399,544 A | | 8/1983 | Monaghan .................. 373/35 |
| 6,127,645 A | * | 10/2000 | Titus et al. ................. 373/22 |
| 6,440,193 B1 | | 8/2002 | Johansen et al. .......... 75/10.27 |
| 2001/0043638 A1 | | 11/2001 | Wittle et al. ............... 373/60 |

FOREIGN PATENT DOCUMENTS

DE    34 05 273       9/1985
EP    0 610 576 A     8/1994

* cited by examiner

Primary Examiner—Tu Hoang
(74) Attorney, Agent, or Firm—Daniel P. Cillo; Glenn E. Klepac; Eckert Seamans Cherin & Mellott, LLC

(57) ABSTRACT

The electrode arrangement uses vertically oriented electrodes with side wall contacts for an electrothermic smelting furnace for aluminum production. The side wall contacts are radially moveable into the furnace to compensate for wear on the contacts. The side wall contacts can be hollow to allow a slag forming charge to be fed to the furnace.

8 Claims, 2 Drawing Sheets

ELECTRODE ARRANGEMENT AS SUBSTITUTE BOTTOM FOR AN ELECTROTHERMIC SLAG SMELTING FURNACE

The Government of the United States of America has rights in this invention, pursuant, to Contract No. DE-FC07-00ID 13900 with the United States Department of Energy.

FIELD OF THE INVENTION

The present invention relates to an electrode arrangement for an electrothermic slag smelting furnace and, more particularly, to a furnace used for producing aluminum by a carbothermic method.

BACKGROUND OF THE INVENTION

In electrothermic slag smelting furnaces, electrodes are oriented vertically and pass through the top of the furnace and penetrate into the molten slag. The electrodes are provided with alternating electric current to heat the slag by resistance heating. Normally, three vertical electrodes are used in electrothermic slag smelting furnaces. In order to allow current to flow through the slag, the bottom lining of the furnace is electrically conductive and constitutes a zero point for the current. One example of such a furnace is disclosed in U.S. Pat. No. 6,440,193. This patent relates to a process and reactor for the carbothermic production of aluminum wherein a molten slag bath of alumina ($Al_2O_3$) and aluminum carbide ($Al_4C_3$) is produced in separate compartments.

It has been found that the use of the electrically conductive bottom lining in electrothermic smelting furnaces has a number of disadvantages. One of the disadvantages of the conductive bottom is that, because of the high wear on the bottom lining, the life of the bottom lining is reduced and repairs or replacements to the bottom lining are frequent. The high wear on the bottom lining is due to the high temperature to which the bottom lining is subjected because the bottom lining is the zero point for the current that flows through the slag of the furnace. Another major disadvantage to the conductive bottom lining is that when the furnace is shut down, restarting of the furnace is difficult due to the solidification or freeze-up of slag in the furnace during the shutdown. Accordingly, there remains a need for an electrothermic smelting furnace having an electrode arrangement substituting for the bottom lining as an electrical contact.

SUMMARY OF THE INVENTION

A principal object of the present invention is to provide an improved electrode arrangement for use in electrothermic slag smelting furnaces which eliminates a number of the problems in the prior art.

It has been discovered that one or more contacts located in the side wall of the furnace can act as a zero point for the current in the furnace, thereby substituting for the bottom lining of the furnace as an electrical contact. Using side wall contacts provides a number of advantages over using the bottom of the furnace as the contact surface.

Broadly, the present invention can be defined as an electrode arrangement for electric slag smelting furnaces having vertical electrodes which are supplied with electric current and are intended to be submerged into the liquid slag bath, said arrangement being characterized in that the furnace has one or more side wall contacts where the side wall contacts extend through the side wall of the furnace into the furnace interior. When there are more than one side wall contacts, the side wall contacts are all connected electrically to each other. The purpose for electrically interconnecting each of the side wall contacts is to make each of the side wall contacts at the same zero point for the current.

It is preferred that where there are more than one side wall contact, all of the side wall contacts are equally spaced around the circumference of the furnace. More preferably, there are at least three side wall contacts which are equally spaced around a circumference of the furnace.

Preferably, the side wall contacts are carbon bodies which are consumed in the furnace during operation and which are replaceable from outside the furnace. Preferably, there are openings in the side wall of the furnace to allow the side wall contacts to pass into the furnace. Each of the openings is equipped with a sealing means for maintaining a gas tight and liquid tight seal between the side wall and the side wall contact. It is preferred that the sealing means allows for radial movement of the contact into the furnace interior in order to compensate for the wear or consumption of the side wall contacts. It is also preferred that the furnace is equipped with a moving means for radially moving each of the side wall contacts into the furnace in order to compensate for the wear on the side wall contacts. Preferably, each of the side wall contacts is equipped with a moving means and each of the side wall contacts can be moved independent of the other side wall contacts to provide for individual adjustment of the side wall contacts in the furnace.

The sealing means is also electrically insulated from the side wall.

In another embodiment of the present invention, one or more of the side wall contacts is hollow and is equipped with a means for feeding charge or slag forming components through the hollow contact while preventing flow of slag through the hole in the contact.

As will be appreciated in the electrode arrangement in the present invention, the side wall contacts are electrically interconnected and constitute a zero point for the current in the furnace. Wear on the side wall contacts can be compensated for by moving the side wall contacts radially inward from time to time.

Because of the electrode arrangement of the present invention, the furnace bottom lining does not need to be electrically conductive and the furnace lining can therefore be designed to withstand the liquid slag and the high temperatures which exist in the furnace. This means that the material that is used to make up the furnace bottom lining can be solely based on its ability to withstand high temperatures and liquid slag. Thus, the present invention makes possible to use the material for the bottom lining onto which a bottom layer of frozen slag has formed. The formation of frozen slag on the bottom lining can be accomplished by using a good thermally conductive material and subjecting the bottom to external cooling. Furthermore, the use of an electrically non-conductive bottom lining means that the bottom lining need not be electrically insulated from the rest of the furnace.

Preferably, the furnace of the present invention is equipped with a tap hole which is placed in the side wall of the furnace at a level below the side wall contacts. This allows for slag to be tapped from the furnace to below the level of the side wall contacts, thus, making it easier to restart the furnace.

BRIEF DESCRIPTION OF THE DRAWINGS

These and other aspects of the present invention may be more fully understood by reference to one or more of the following drawings wherein.

DETAILED DESCRIPTION OF PREFERRED EMBODIMENTS

Figure 1:
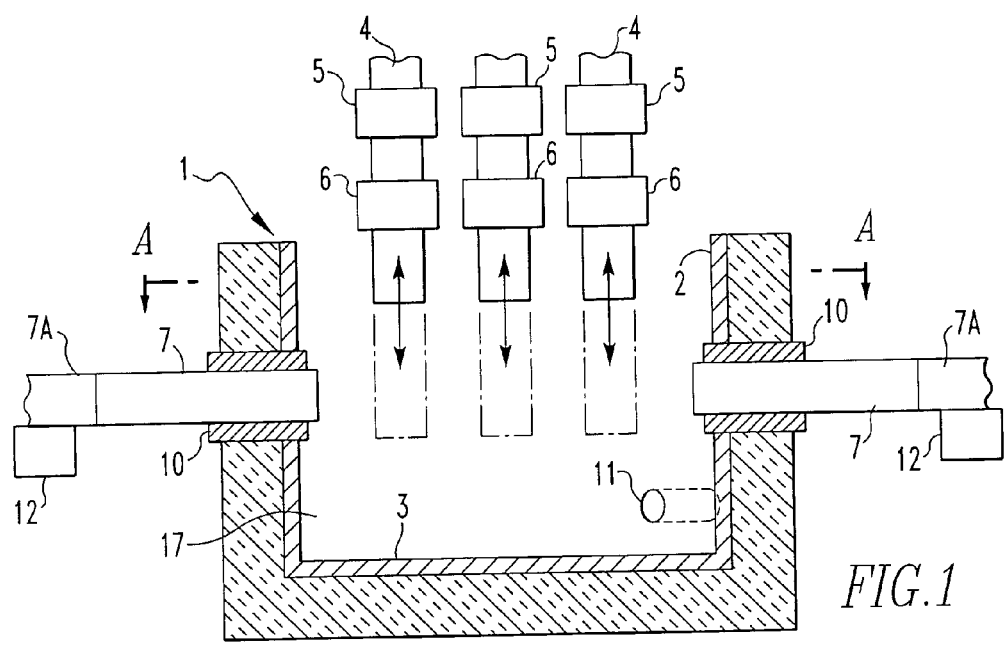
FIG. 1 shows a vertical sectional view through a slag smelting furnace equipped with the side wall contacts according to the present invention.

In FIG. 1, smelting furnace 1 has a furnace pot with side wall 2 and bottom or bottom lining 3. The bottom lining 3 preferably comprises an electrically insulating refractory material. Furnace 1 is equipped with three conventional vertical carbon electrodes 4. Electrodes 4 are equipped with holding and slipping means 5 to allow for vertical movement of the electrodes and current clamps 6 to provide electric current to electrodes 4 from a power source (not shown) in a conventional manner.

Four horizontal side wall contacts 7 pass through openings 8 in side wall 2 of furnace 1 such that side wall contacts 7 extend into the interior 17 of furnace 1. Side wall contacts 7 are electrically interconnected by electrical conductor 9. Side wall contacts and their electrical conductor 9 are grounded so as to provide a zero point for the current, but are not connected to the power source. Each of side wall contacts 7 has a sealing means 10 which prevents liquid slag from escaping through openings 8. Sealing means 10 also electrically insulates side wall contacts 7 from side wall 2 and allows for horizontal movement of side wall contacts 7 into furnace 1. Such sealing means are conventional and are typically employed for electrodes which are used in the side walls of furnaces.

Tap hole 11 is positioned in the side wall 2 of furnace 1 to allow molten slag to be removed from furnace 1 to a level below the height of side wall contacts 7. This tap hole is conventional and is operated in a conventional manner.

In order to adjust the depth to which side wall contacts 7 extend into furnace 1, moving means 12 is employed with each side wall contact 7. Moving means 12 moves contact 7 into the furnace. Moving means 12 is conventional and can be operated in a conventional manner.

Side wall contacts 7 are preferably conventional carbon bodies which are used in the smelting industry to conduct electricity in a smelting furnace. As side wall contacts 7 are worn down inside furnace 1, moving means 12 moves contacts 7 into furnace 1. Additional carbon bodies 7A as shown in FIG. 1 are attached to the end of side wall contact 7 which extends outside the furnace so as to provide a continuous feed of side wall contacts 7 into the furnace. Such carbon bodies are conventional as is the means to connect multiple carbon bodies to each other.

One or more side wall contacts 7 may be hollow. FIG. 3 is similar to FIG. 2 except for the fact that contact 13 is hollow and has means 14 for feeding slag forming components to furnace 1 through opening 15. The use of hollow side wall contact 13 allows for charge or slag forming materials to be fed to furnace 1. The use of opening 15 in side wall 2 of furnace 1 to feed charge to furnace 1 is operated in a conventional manner using conventional equipment.

As shown in FIG. 1, side wall contacts 7 are spaced vertically above bottom 3. This allows bottom 3 to cool and allow for a layer of frozen slag to form on the bottom 3. Bottom 3 can house a conventional cooling means (not shown) to cool bottom 3 and allow for the formation of frozen slag. The formation of frozen slag on the bottom helps to reduce the wear on the bottom of the furnace.

Figure 2:
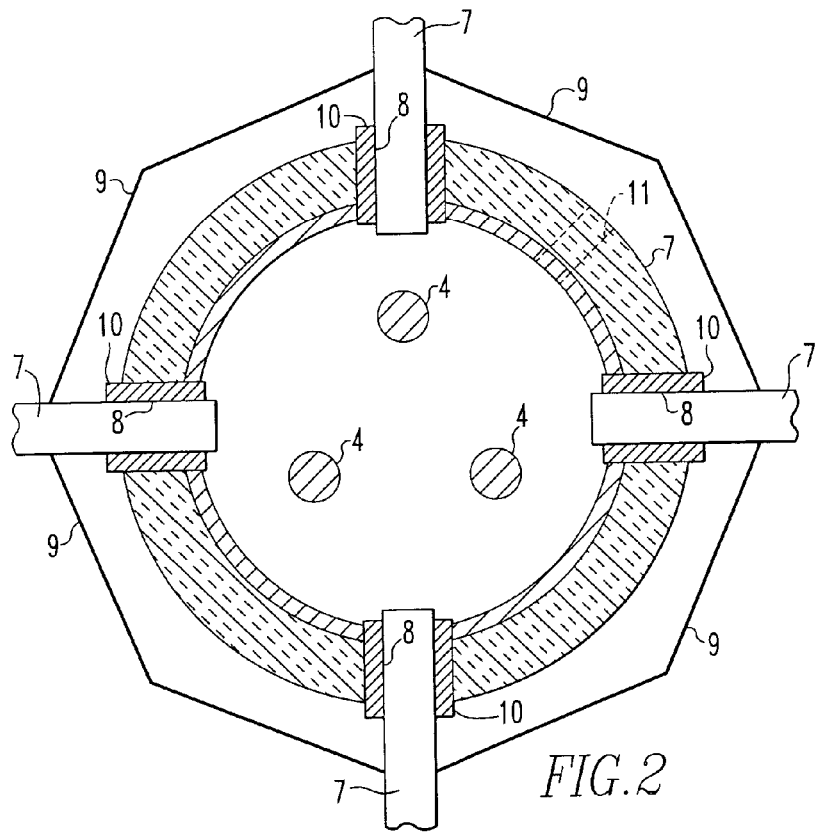
FIG. 2 shows a horizontal view taken along A—A of FIG. 1.
Figure 3:
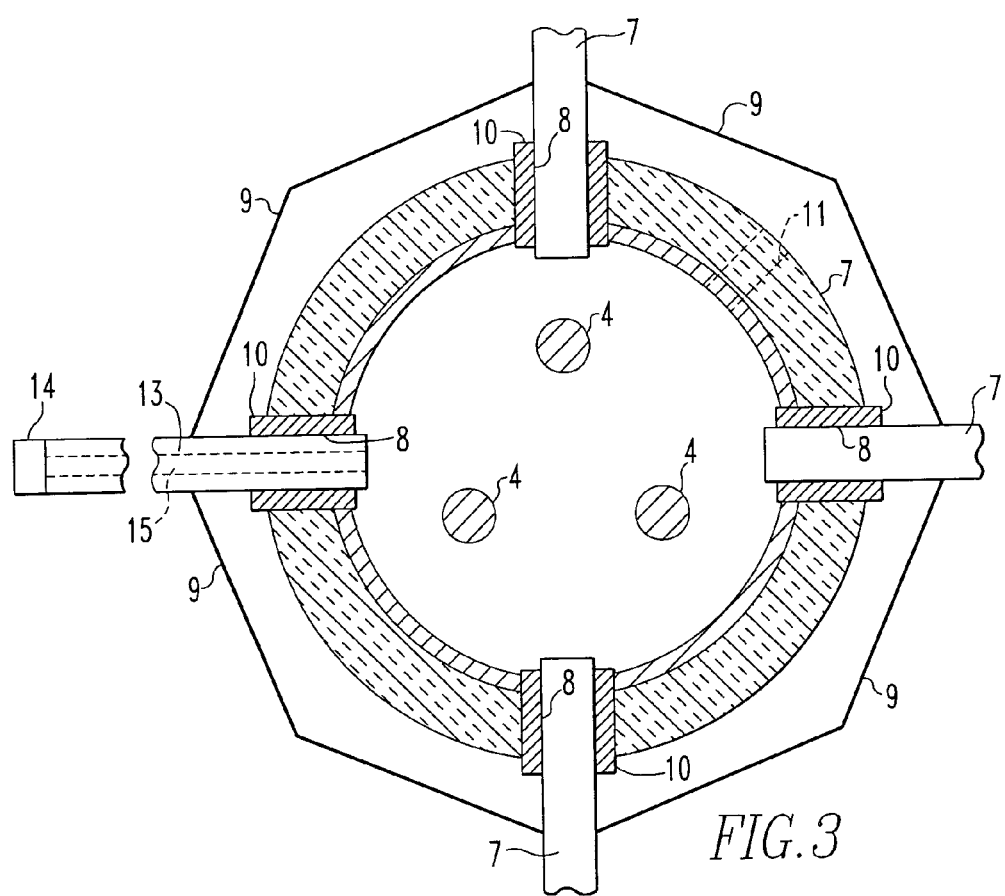
FIG. 3 shows a horizontal view of the furnace of the present invention similar to the one shown in FIG. 2 except one of the side wall contacts is hollow.

As can be seen in FIG. 2, side wall contacts 7 are equally spaced about the circumference of the furnace.

In operation, alternating electric current is supplied to electrodes 4 through contact clamps 6. The current flows from each electrode 4 through the liquid slag bath to the nearest side wall contact 7 and back through one of the other electrodes 4. Since side wall contacts 7 are interconnected by electrical conductor 9, each of the side wall contacts 7 will always be at the same electric potential and, thus, act as a zero point for the current.

To restart the furnace, vertical electrodes 4 are lowered into the slag or the charge until they are below the horizontal level of side wall contacts 7 as shown in FIG. 1 by the dotted lines. Once electrical contact by way of current has been made between electrodes 4 and side wall contacts 7, electrodes 4 are raised to a conventional level and the furnace is operated in a conventional manner except for the fact that the current flows to side wall contact 7.

It will be understood that the claims are intended to cover all changes and modifications of the preferred embodiments of the invention herein chosen for the purpose of illustration which do not constitute a departure from the spirit and scope of the invention. For example, while the particularly preferred embodiment described above relies upon alternating current, the invention is also applicable to furnaces electrically heated by direct current.

Having described the presently preferred embodiments, it is to be understood that the invention may be otherwise embodied within the scope of the appended claims.

What is claimed is:

1. An electrode arrangement for an electric slag melting furnace comprising a bottom wall and at least one side wall defining a furnace interior, said furnace having vertical electrodes for supply of alternating electric current, said vertical electrodes being intended to be submerged in a liquid slag bath, said electrode arrangement being characterized in that the furnace has at least one side wall contact extending into the furnace interior through a side wall of the furnace where the at least one side wall contact is equipped with means for moving the side wall contact radially into the furnace in order to compensate for wear of the at least one side wall contact.

2. Electrode arrangement according to claim 1 wherein there are two or more side wall contacts and all the side wall contacts are electrically interconnected.

3. Electrode arrangement according to claim 1, characterized in that at least three side wall contacts are equally circumferentially spaced around the furnace side wall.

4. Electrode arrangement according to claim 1, characterized in that the at least one side wall contact is a carbon body inserted into sealed openings in the side wall of the furnace.

5. Electrode arrangement according to claim 1 characterized in that the at least one side wall contact is hollow and has means for feeding slag forming components through the hollow contact.

6. A process for heating a mass of slag in an electric slag smelting furnace comprising a bottom wall and at least one side wall defining a furnace interior, a plurality of vertical electrodes above said interior, and at least one side wall contact extending into said interior, said process comprising passing an alternating electric current from at least one of said vertical electrodes through a mass of slag in said interior and to the at least one side wall contact and the at least one side wall contact is equipped with means for moving the contact radially into the furnace in order to compensate for wear of the at least one side wall contact.

7. The process of claim 6, wherein the at least one side wall contact is hollow and defines an opening, said process further comprising feeding slag forming components through said opening into said furnace interior.

8. The process of claim 6, wherein said bottom wall includes a lining comprising an electrically insulating refractory material.

* * * * *

UNITED STATES PATENT AND TRADEMARK OFFICE
CERTIFICATE OF CORRECTION

PATENT NO.        : 6,980,580 B2
APPLICATION NO.  : 10/646507
DATED             : December 27, 2005
INVENTOR(S)       : JA Aune, JC Brinch and K Johansen It is certified that error appears in the above-identified patent and that said Letters Patent is hereby corrected as shown below:

Assignee:   Alcoa Inc., Pittsburgh, PA (US)
            Elkem ASA, Oslo (Norway)

Support for this correction (Reel/Frame Recordation & Issue Fee Transmittal) are submitted herewith.

Signed and Sealed this

Twenty-ninth Day of August, 2006

JON W. DUDAS
*Director of the United States Patent and Trademark Office*